United States Patent
Charny et al.

(10) Patent No.: US 7,433,966 B2
(45) Date of Patent: Oct. 7, 2008

(54) IMPLICIT SHARED BANDWIDTH PROTECTION FOR FAST REROUTE

(75) Inventors: Anna Charny, Sudhury, MA (US); Robert James Goguen, Acton, MA (US); Carol Iturralde, Framingham, MA (US)

(73) Assignee: Cisco Technology, Inc., San Jose, CA (US)

( * ) Notice: Subject to any disclaimer, the term of this patent is extended or adjusted under 35 U.S.C. 154(b) by 787 days.

(21) Appl. No.: 10/038,259

(22) Filed: Jan. 2, 2002

(65) Prior Publication Data

US 2003/0126287 A1   Jul. 3, 2003

(51) Int. Cl.
  *G06F 15/173* (2006.01)
(52) U.S. Cl. ................................ 709/239; 709/238
(58) Field of Classification Search .............. 709/239, 709/238; 370/218
  See application file for complete search history.

(56) References Cited

U.S. PATENT DOCUMENTS

| | | | | |
|---|---|---|---|---|
| 5,020,052 | A | | 5/1991 | Deprycker et al. .......... 370/60 |
| 5,856,981 | A | | 1/1999 | Voelker ................. 371/20.1 |
| 6,535,481 | B1 | * | 3/2003 | Andersson et al. .......... 370/225 |
| 6,895,441 | B1 | * | 5/2005 | Shabtay et al. ............ 709/238 |
| 2002/0004843 | A1 | * | 1/2002 | Andersson et al. .......... 709/238 |
| 2002/0067693 | A1 | * | 6/2002 | Kodialam et al. .......... 370/216 |
| 2002/0112072 | A1 | * | 8/2002 | Jain ....................... 709/239 |
| 2002/0172149 | A1 | * | 11/2002 | Kinoshita et al. .......... 370/216 |
| 2003/0009582 | A1 | * | 1/2003 | Qiao et al. ............... 709/233 |
| 2003/0016664 | A1 | * | 1/2003 | MeLampy et al. .......... 370/389 |
| 2003/0117950 | A1 | * | 6/2003 | Huang .................... 370/220 |

FOREIGN PATENT DOCUMENTS

WO   WO 97/06644   2/1997

OTHER PUBLICATIONS

Ryutaro Kawamura, Ken-ichi Sato, and Ikuo Tokizawa, "Self-Healing ATM Networks Based on Virtual Path Concept," Jan. 1994, IEEE, vol. 12, No. 1, pp. 120-127.*
R. Braden, et al. "Resource ReSerVation Protocol (RSVP)—Version 1 Functional Specification," RFC 2205, Internet Engineering Task Force, Sep. 1997.
D. Awduche, et al. "Requirements for Traffic Engineering Over MPLS," RFC 2702, Internet Engineering Rask Force, Sep. 1999.

(Continued)

*Primary Examiner*—William C. Vaughn, Jr.
*Assistant Examiner*—Ranodhi N Serrao
(74) *Attorney, Agent, or Firm*—Cindy Kaplan

(57) ABSTRACT

A virtual overlay backup network is established to provide Fast Reroute capability with guaranteed bandwidth protection to a network that employs end-to-end circuits such as label switched paths (LSPs). In some implementations, backup bandwidth is allocated from an available backup bandwidth pool, as defined herein, available on each link. Complete bandwidth protection may be provided rapidly upon detection of a failure while available backup bandwidth is shared between independent failures. In one embodiment, this is accomplished by provisioning backup tunnels to protect all links and nodes, wherein total available backup bandwidth on any link is not exceeded by the requirements of backup tunnels protecting any single node but backup tunnels protecting different nodes may share bandwidth.

24 Claims, 4 Drawing Sheets

OTHER PUBLICATIONS

E. Rosen, et al. "Multiprotocol Label Switching Label Switching Architecture," RFC 3031, Internet Engineering Task Force, Jan. 2001.

D. Gan, et al. "A Method for MPLS LSP Fast-Reroute Using RSVP Detours," Internet Draft, Internet Engineering Task Force, Apr. 2001.

J. P. Lang, et al. Generalized MPLS Recovery Mechanisms, Internet Draft, Internet Engineering Task Force, Jun. 2001.

P. Ashwood-Smith, et al. Generalized MPLS Signaling—RSV-TE Extensions, Internet Draft, Internet Engineering Task Force, Oct. 2001.

Pan, et al. "Fast Reroute Techniques in RSVP-TE," Internet Draft, Internet Engineering Task Force, Nov. 2001.

F. LeFaucheur, et al. "Requirements for Support of Diff-Serv-aware MPLS Traffic Engineering," Internet Draft, Internet Engineering Task Force, Nov. 2001.

* cited by examiner

IMPLICIT SHARED BANDWIDTH PROTECTION FOR FAST REROUTE

BACKGROUND OF THE INVENTION

The present invention relates to data networking and more particularly to systems and methods for providing fault tolerance to data networks.

As the Internet becomes a multi-media communications medium that is expected to reliably handle voice and video traffic, network protocols must also evolve to support quality-of-service (QoS) requirements such as latency and reliability and to provide guaranteed available bandwidths. One form that this evolution is taking is the advent of MPLS (Multi-Protocol Label Switching) Traffic Engineering which may be further supplemented by DiffServ-aware Traffic Engineering. Rather than using conventional IP routing techniques where individual packets travel through the network following paths determined individually for each packet as it progresses through the network, MPLS Traffic Engineering exploits modem label switching techniques to build guaranteed bandwidth end-to-end circuits through a network of label switched routers (LSRs). MPLS has been found to be highly useful in establishing such circuits also referred to as label switched paths (LSPs). MPLS networks employing LSPs can more easily interoperate with other IP-based networks than other virtual circuit-oriented networks employing, e.g., ATM or Frame Relay. Networks based on MPLS Traffic Engineering, especially those supplemented by DiffServ-Aware Traffic Engineering are very effective in handling delay and jitter-sensitive applications such as voice over IP (VoIP) and real-time video.

Meeting the demands of businesses and consumers, however, also requires that bandwidth and latency guarantees continue to be met when links or nodes fail. When failure of a link or a node causes the failure of an LSP, the standard routing protocols such as constraint-based shortest path first (CSPF) are too slow to be used for dynamic rerouting of QoS-sensitive traffic. In optical networks employing SONET, fast restoration can be provided by means of features incorporated into the SONET protocol. However, where such techniques are not available, other protection mechanisms become necessary to ensure that services are restored within a sufficiently short time, e.g., 50 ms, such that the user experience is not affected.

In order to provide the desired response time upon failure detection, Fast Reroute solutions have concentrated on defining backup tunnels in advance that can be activated upon detection of a failure. One approach is to define a backup LSP for each primary LSP. The backup LSP must be link-and-node disjoint with its corresponding primary LSP. When a failure occurs, the head-end of the primary LSP is notified about the failure, and the traffic of this LSP is rerouted to the backup LSP. This approach is referred to as path protection.

There are, however, a number of difficulties that render path protection impractical. A first class of difficulties relates to the need to signal the LSP head end of a failure in a node or link employed by the LSP. The signaling delays involved in delivering failure notification to the head-end of the LSP can be unacceptably long, making it impossible to meet the Fast Reroute response time objectives. Furthermore, a failed link or node will often be traversed by numerous LSPs and thus a failure of a link or a node will result in a large number of signaling messages signaling the failure of each LSP. Delivering such a large number of messages within a very short time available for restoration is very burdensome, and frequently impossible, for the network.

A second class of difficulties with path protection relates to usage of available backup bandwidth. Using standard routing protocols, such as CSPF, to establish a backup LSP with a bandwidth reservation at the same time as a primary LSP will tend to result in highly inefficient bandwidth usage. This is because, although Fast Reroute need only be able to react to a single point of failure, the conventional routing protocols will not permit backup bandwidth allocated for handling one failure to be available to support another failure, thus failing to exploit the potential to share backup bandwidth. It is extremely difficult to remedy this deficiency of path protection techniques because sharing backup bandwidth effectively among numerous backup LSPs represents a very complicated optimization problem and requires a very large amount of signaling to enable complete sharing. Another difficulty with path protection is that the amount of LSP state information to be maintained at each node in the network doubles to accommodate both the primary LSPs and the backup LSPs.

Because of these shortcomings of the path protection approach, other Fast Reroute development efforts have considered instead protecting individual nodes and links by establishing local backup tunnels (also implemented as LSPs) that are used to reroute all traffic around the failure. To protect a given element (link or node), backup tunnels are established between pairs of neighbors of this element. In one such approach, when a primary LSP is created, a series of backup tunnels is also defined including a backup tunnel for each intermediate node along the primary LSP and a backup tunnel for the final link in the LSP. This is done independently for each primary LSP with no sharing of backup tunnels between different primary LSPs even when the primary LSPs share links and nodes in common. To avoid inefficient use of available backup bandwidth for the numerous tunnels, the tunnels are established without reserving bandwidth.

One drawback of this approach is the cumbersomeness of utilizing so many backup tunnels some of which are essentially duplicative in their purpose. Another problem arises because bandwidth is not reserved for the backup tunnels. Consider a situation where a single node employed by multiple LSPs fails. The local backup tunnels of each affected primary LSP will be activated to implement Fast Reroute protection but these backup tunnels may in fact have links in common and there may be one or more links with insufficient backup bandwidth available to support all of the newly activated backup tunnels. The temporary reduction of bandwidth may then adversely affect the services provided by the network.

In an alternative approach to link and node protection, local backup tunnels may be shared among multiple LSPs traversing the same node resulting in a savings in signaling and needed state information storage. However, there is still no guarantee that sufficient bandwidth will be available.

What are needed are systems and methods for Fast Reroute that provide complete bandwidth protection while also sharing available backup bandwidth between independent failures.

SUMMARY OF THE INVENTION

According to one embodiment of the present invention, a virtual overlay backup network is established to provide Fast Reroute capability with guaranteed bandwidth protection to a network that employs end-to-end circuits such as label switched paths (LSPs). As explained in greater detail herein, a "pool" of backup bandwidth is established on the links of the network. Complete bandwidth protection may be provided rapidly upon detection of a failure while available backup bandwidth is shared between independent failures. In one embodiment, this is accomplished by provisioning backup tunnels to protect all links and nodes, wherein total available backup bandwidth on any link is not exceeded by the requirements of backup tunnels protecting any single node but backup tunnels protecting different nodes may share bandwidth.

A first aspect of the present invention provides a method for protecting a node in a data communication network. The method includes processes of: establishing a backup bandwidth pool on links of the data communication network; identifying a link pair traversing the node where the link pair has a bandwidth to be protected, establishing as a backup for the link a set of one or more paths that do not include said node where one or more paths collectively have backup bandwidths greater than or equal to the bandwidth to be protected, deducting, for each link included in the set of paths, from backup bandwidth available for protecting the node, while not deducting from backup bandwidth available for protecting other nodes in the data communication network, and repeating the process of identifying, establishing, and deducting for a plurality of link pairs traversing the node.

A second aspect of the present invention provides a method for operating a data communication network to provide protection to nodes in the data communication network. The method includes: maintaining for each of a plurality of links in the data communication network, a primary bandwidth pool and a backup bandwidth pool and establishing backup tunnels to protect the nodes where each of the backup tunnels consume backup bandwidth from backup bandwidth pools of selected ones of the plurality of links. All backup tunnels protecting any particular node of the network do not consume more bandwidth on any link than provided by the link's backup bandwidth pool but there is at least one set of backup tunnels that protect disparate nodes and that consume more bandwidth on at least one link than provided by the at least one link's backup bandwidth pool.

A third aspect of the present invention provides a method for protecting a node in a data communication network. The method includes: performing computations at the node to identify backup tunnels to protect the node and signaling the backup tunnels to other nodes of the data communication network.

Further understanding of the nature and advantages of the inventions herein may be realized by reference to the remaining portions of the specification and the attached drawings.

DESCRIPTION OF SPECIFIC EMBODIMENTS

MPLS Traffic Engineering Network Environment

Figure 2:
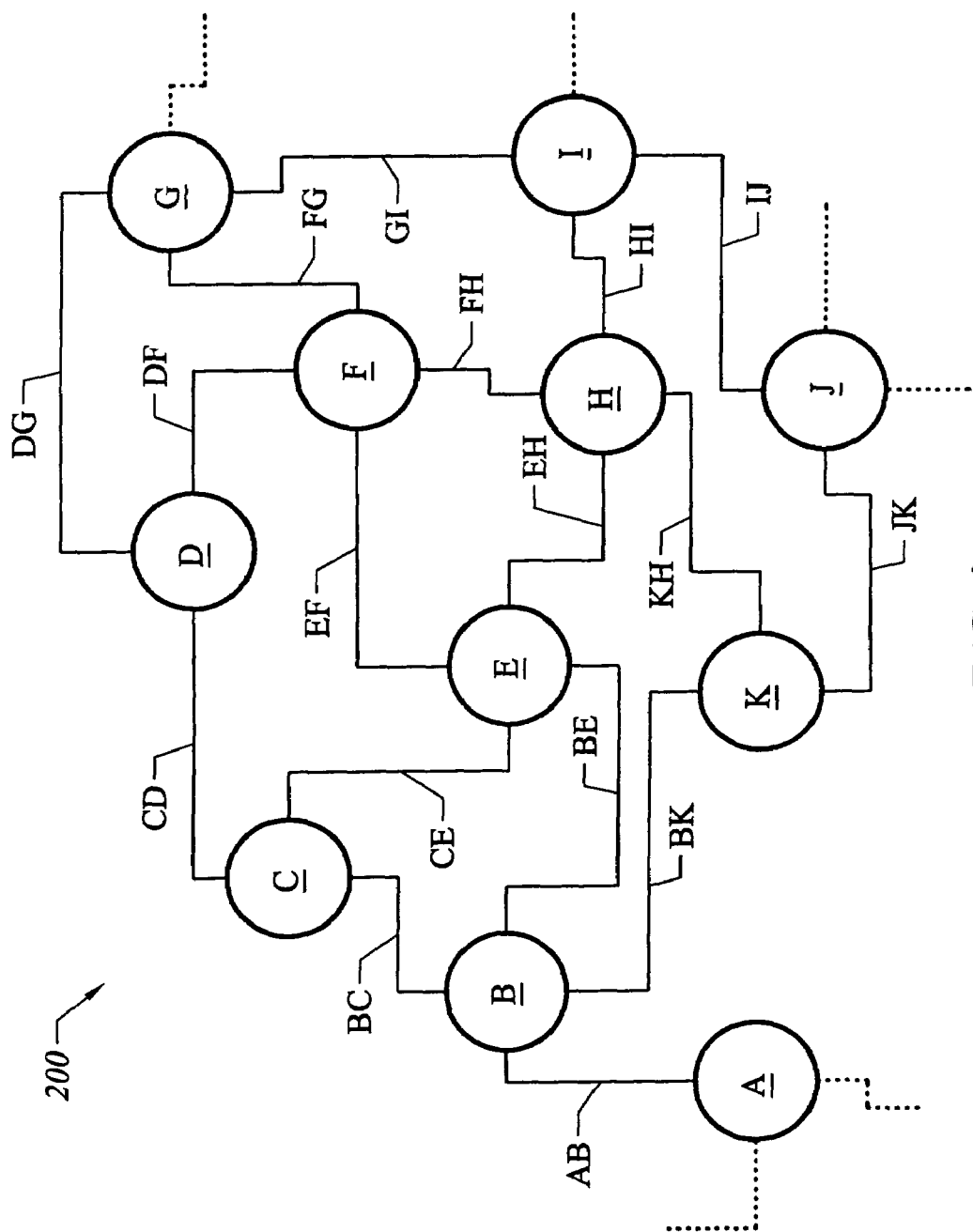
FIG. 2 illustrates a network for the purpose of describing the operation of one embodiment of the present invention.

The present invention will be described with reference to a representative network environment that employs a certain combination of network protocols to forward data through the network. FIG. 2 depicts a representative network 200 including nodes A through K. Interconnecting the nodes of network 200 are individual links xy where x identifies one endpoint of the link and small y identifies the other one. The links may be implemented using any type of physical medium such as e.g., an optical medium, a wireless medium, twisted pair, etc.

In one embodiment, the nodes of network 200 interoperate in a manner specified by various protocols including, e.g., TCP/IP as known in the art, suitable link layer protocols such as Link Management Protocols (LMP), and protocols defined by the following documents:

E. Rosen, et al., "Multiprotocol Label Switching Architecture," RFC 3031, Internet Engineering Task Force, January 2001.

Braden, et al. "Resource ReSerVation Protocol (RSVP)-Version 1 Functional Specification," RFC 2205, Internet Engineering Task Force, September 1997.

Awduche, et al., "Requirements for Traffic Engineering Over MPLS," RFC 2702, Internet Engineering Task Force, September 1999.

Ashwood-Smith, et al., "Generalized MPLS Signaling —RSVP-TE Extensions,"Internet Draft, Internet Engineering Task Force, October 2001.

Le Faucheur, et al., "Requirements for Support of Diff-Serv-Aware MPLS Traffic Engineering," Internet Draft, Internet Engineering Task Force, November 2001.

Pan, et al., "Fast Reroute Techniques in RSVP-TE," Internet Draft, Internet Engineering Task Force, October 2001.

The contents of the above protocol documents are all herein incorporated by reference in their entirety for all purposes. Other suitable protocols as known in the art may also be implemented by nodes of network 200.

In one embodiment, the nodes of network 200 are IP routers that implement multiprotocol label switching (MPLS) and essentially operate as label switched routers (LSRs). At the ingress to network 200, a label is assigned to each incoming packet before forwarding the packet to the next hop node. At each intermediate node, a forwarding selection and a new substitute label are determined solely by using the label found in the incoming packet as a reference to a label forwarding table that includes this information. At the network egress, a forwarding decision is made based on the incoming label but no label is included when the packet is sent on to the next hop.

It is desirable to provide end-to-end circuits across network 200 having guaranteed bandwidth, latency, jitter, etc. This is provided by employing MPLS Traffic Engineering (MPLS TE) and/or MPLS TE supplemented by Diffserv-Aware Traffic Engineering (DS-TE).

MPLS TE essentially builds and operates end-to-end circuits across LSRs by appropriately controlling the contents of the label forwarding tables at the various LSRs of network 200. Each end-to-end circuit is referred to as a Label Switched Path (LSP). Each LSP traverses a series of nodes and interconnecting links.

MPLS Traffic Engineering Fast Reroute

General MPLS TE fast reroute concepts will now be discussed to facilitate the discussion of systems and methods of the present invention. It is desirable that network 200 provide very high reliability to support Internet services such as voice telephony and video conferencing where such a level of reliability is both expected and necessary. Accordingly, it is desired that when a node or a link fails such that all the LSPs employing that failed link or node are rerouted in under 50 ms so that the user experience is not affected by the failure. When a given LSP in a network employing MPLS TE experiences a node failure, the head-end, i.e., the ingress, will automatically establish a new LSP as a substitute. However, this process requires far more than 50 ms. The failure of a single node may require the reestablishment of as many as e.g., 2000 LSPs. Accordingly, a local fast reroute capability is provided so that when a node or a link fails, an LSP is temporarily rerouted around the failed element while a new end-to-end LSP is being established at the head-end.

A failure is detected, preferably within 10 ms. A link or node failure may detected, e.g., at the link layer or by failure to receive an expected RSVP HELLO message (or by any other method). Once a failure of an element is detected, traffic from each primary LSP traversing the failed element is redirected to the backup tunnels pre-established to protect the failed element. At the node where the backup tunnel starts (called the head-end of the backup tunnel), packets traversing an impacted LSP have a second level label imposed on their label stacks. This second level label is the basis for forwarding decisions through the backup tunnel. At each successive node of the backup tunnel, the second level label is used to select a next hop and a substitute second level label. At the final node of the backup tunnel, or alternatively at the penultimate node of the backup tunnel, this second level label is popped off the packet label stack so that the packet thereafter follows the original path of the LSP.

The LSP head-ends of all affected primary LSPs are also notified of the failure so that the LSP that is now rerouted via the backup tunnel can be rerouted in a more optimal way. The details of the mechanics of patching in backup tunnels and reacting to the failure of protected elements are disclosed in the Internet Draft entitled "Fast Reroute Techniques in RSVP-TE."

Establishment of Backup Tunnels

The process of establishing backup tunnels in accordance with one embodiment of the present invention will now be discussed. The backup tunnels are established in such a way so that for each protected node, there is guaranteed to be sufficient backup bandwidth for all the LSPs employing that node. Backup bandwidth, however, may be shared among backup tunnels protecting different nodes.

This assured bandwidth protection cannot readily be provided by path protection because backup bandwidth cannot be shared among protected nodes. Instead, fast reroute protection with guaranteed bandwidth protection is provided by use of a virtual backup overlay network. Backup tunnels are established for each node and each link to protect the node or link upon failure. By protecting every node and link in this way, complete fast reroute protection for every LSP through network 200 is provided.

On each link in the network, there is primary bandwidth allocated for use by primary LSPs. In one embodiment of this invention, a primary pool includes the maximum amount of bandwidth that can be allocated to primary LSPs at any time. In another embodiment, the primary bandwidth may be the actual bandwidth currently used by primary LSPs (which may be smaller than the maximum bandwidth pool allocated for primary LSPs. There is also a backup bandwidth pool allocated for use by backup tunnels. The backup bandwidth pool is always the maximum amount of bandwidth that is allocated for backup traffic, regardless of how much bandwidth is actually backed up on the link.

For implementations that employ MPLS-TE without DS-TE, the primary bandwidth pool includes bandwidth equivalent to a defined maximum reservable bandwidth for LSPs or, alternatively, bandwidth equivalent to the bandwidth actually used by LSPs. A backup bandwidth pool is established on each link and preferably contains a bandwidth equivalent to the link speed minus the maximum reservable bandwidth.

It is also possible to allow limited "overbooking" in the event of failure of an element protected by the link such that total bandwidth reservations on the link exceed link capacity and then rely on TCP operation to adjust in response to the shortfall. In this type of implementation, the backup bandwidth pool may exceed the link speed minus the maximum reservable bandwidth. The benefit of this invention in this context is that overbooking can be limited to a specified factor. In contrast, it is very difficult to control the amount of overbooking with conventional approaches.

For implementations that employ DS-TE, the primary bandwidth can be, e.g., the maximum reservable bandwidth of a particular bandwidth "subpool" as this term is defined by the document cited above entitled "Requirements for Support of Diff-Serv-Aware MPLS Traffic Engineering." The backup bandwidth pool then, for example, includes a configurable fraction of the remaining bandwidth on the link.

Preferably, in protecting an element the objective is to provide backup tunnels with sufficient bandwidth to protect all the primary LSPs employing that element. In one embodiment, a node is protected by providing backup tunnels for each pair of links traversing the node such that the total bandwidth of the backup tunnels exceeds the primary bandwidth of the link pair, i.e., the lesser of the primary bandwidths of the two links. If the primary bandwidth is defined according to the total needs of current LSPs, backup tunnel configuration should be dynamically readjusted in response to establishment of new LSPs and deletion of inactive LSPs.

Figure 3:
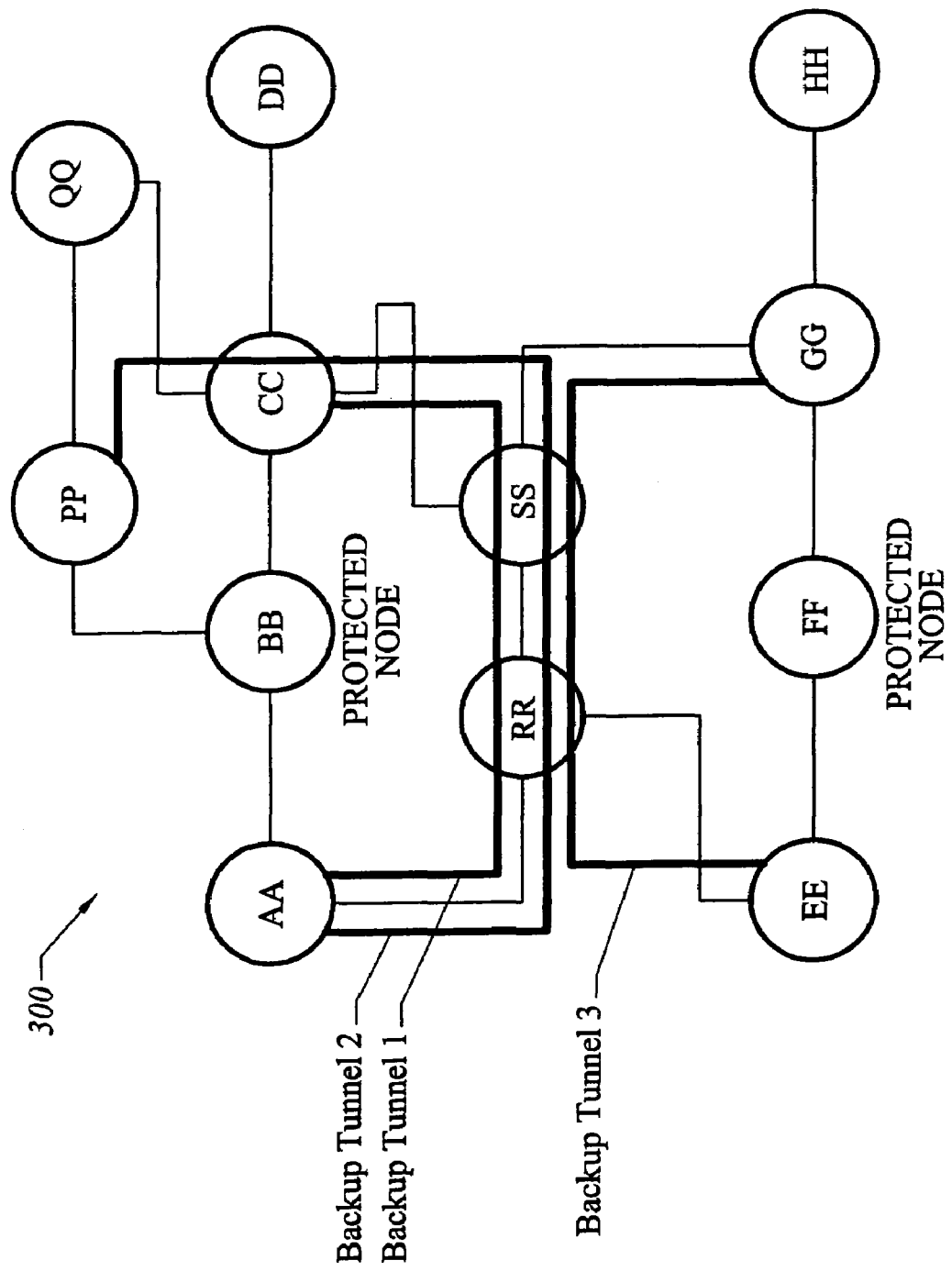
FIG. 3 depicts nodes of a network implementing Fast Reroute according to one embodiment of the present invention.

For an illustration of a backup tunnel establishment scheme according to one embodiment of the present invention, consider node protection in a network fragment 300 depicted in FIG. 3. Now consider Fast Reroute protection of a node BB. Protection for traffic passing from node AA through node BB to node CC may be provided by a backup tunnel 1 that traverses node RR and node SS on its way to node CC. Traffic passing from node AA through node BB on to node PP may also be Fast Reroute protected by a backup tunnel 2 traversing nodes RR, SS, and CC. It will be seen then that the link between node RR and node SS can carry multiple backup tunnels protecting node BB. The sum of the bandwidth consumed by all these backup tunnels sharing a single link should not exceed the backup bandwidth available on that link.

However, the present invention also provides that bandwidth is implicitly shared between backup tunnels protecting different nodes. It is assumed that Fast Reroute need only address failure of a single node and not the simultaneous failure of two or more nodes since the Fast Reroute protection represents only a temporary patch prior to establishment of a new LSP. Consider a backup tunnel 3 that forms a part of the Fast Reroute protection of node FF. The bandwidth of backup tunnel 3 is not subtracted from the backup bandwidth available to protect node BB on the link between RR and SS According to the present invention, the determination of backup tunnels and the establishment of an overlay backup network may be performed in a distributed fashion with each node establishing its own protection backup tunnels and appropriately distributing the information to adjacent nodes as appropriate as well as the nodes traversed by the backup tunnels.

For a unidirectional link, the node for which the link is coupled to an output interface, establishes the backup tunnels to protect the link. For a bi-directional link, the two nodes that are connected by the link may negotiate with each other to determine which node establishes the backup tunnel. A default condition may be that the node with the lower IP address establishes the backup tunnels. As with the nodes, the backup tunnels for the links are signaled as needed. Distributing the necessary computations in this way minimizes required signaling. Alternatively, a workstation or management node may determine backup tunnels for multiple nodes and links or even an entire network.

Figure 4:
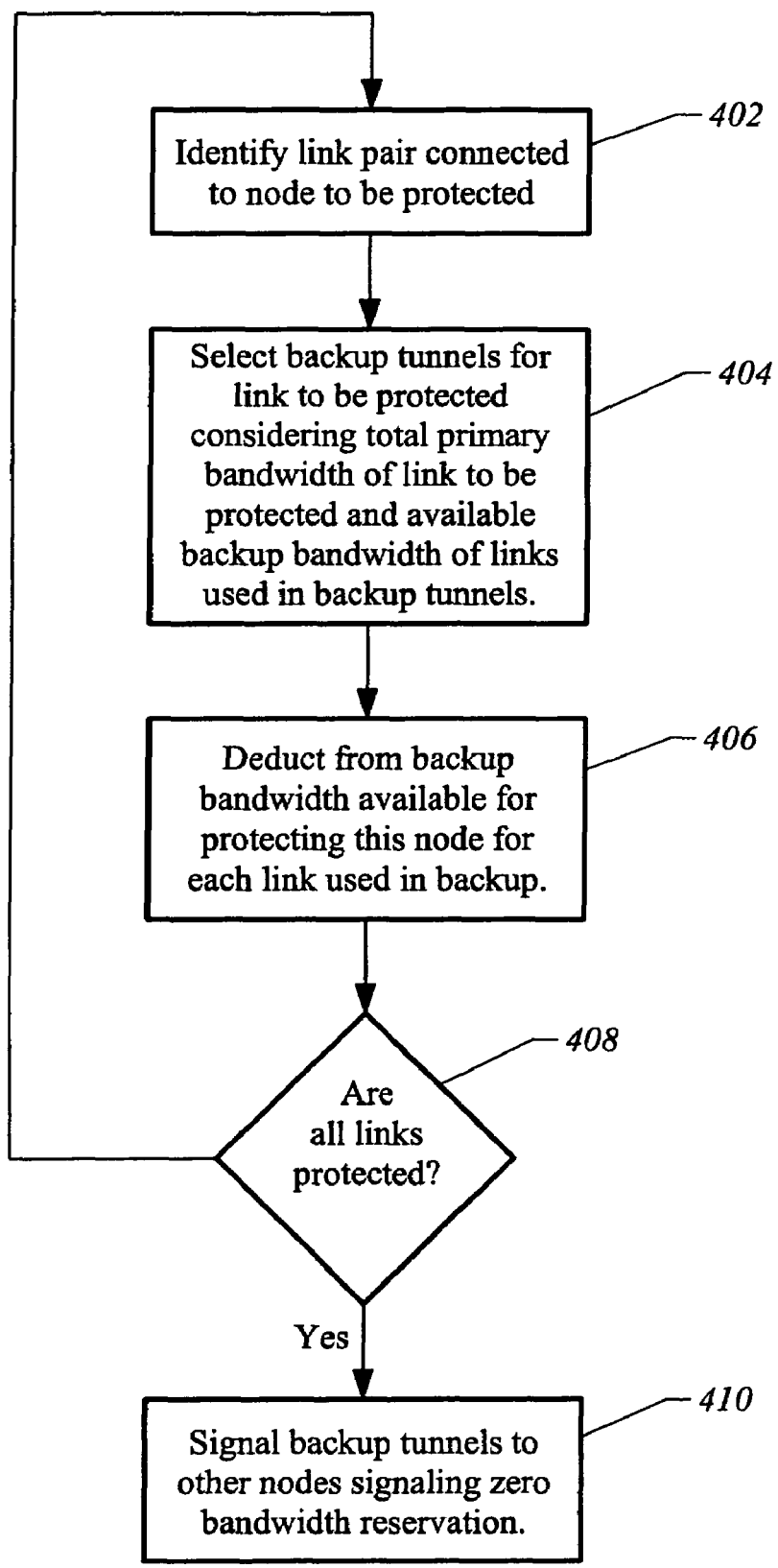
FIG. 4 is a flowchart describing steps of establishing an overlay backup network according to one embodiment of the present invention.

The process of establishing backup tunnels to protect a particular node using Fast Reroute techniques as enhanced in accordance with one embodiment of the present invention will now be discussed in detail. Particular attention should be paid to the bandwidth sharing between backup tunnels protecting disparate nodes provided intrinsically by signaling backup tunnels with zero bandwidth. FIG. 4 is a flowchart describing steps of establishing backup tunnels for a particular node. At step 402, the process begins by identifying a pair of links traversing the node to be protected. For example, for node BB in FIG. 3 one such pair would be node AA and PP. At step 404, one or more possible backup tunnels are identified that would be used to reroute traffic that would otherwise flow through this link pair and the protected node. First, the primary bandwidth to be protected is determined as the lesser of the primary bandwidths of the two links of the pair.

Details of backup tunnel placement are not germane to the present invention but placement of backup tunnels should satisfy various criteria. The backup tunnels should not include the node that is being protected. Each backup tunnel will have an associated bandwidth determined by the lowest backup bandwidth available at any of the links traversed by the tunnel. The sum of the bandwidths of the backup tunnels should be greater than or equal to the determined primary bandwidth of the link pair, or alternatively the total bandwidth allocated to LSPs employing that link pair. Also, according to one embodiment of the present invention, for each link employed by the backup tunnels, the total bandwidth consumed by the backup tunnels protecting any one node should not exceed the available backup bandwidth of the link. Information about available backup bandwidth and primary bandwidths of various links may be learned using simple extensions to the operative link state routing protocol such as e.g., OSPF. Individual backup tunnels may be placed by iterating the well-known CSPF procedure until a combination of backup tunnels having sufficient bandwidth is found.

At step 406, for each link employed in the backup tunnels established at step 404, the bandwidth employed by the backup tunnels is deducted from the total backup bandwidth (i.e., the backup bandwidth pool) of the link available for use in protecting this node. This step assures that sufficient bandwidth will be available for Fast Reroute protection of the protected node.

A step 408 then tests whether all link pairs connected to the node are protected with backup tunnels. If more link pairs need to be protected, the process returns to step 402 for another iteration. If backup tunnels have been established for all link pairs, then processing proceeds to a step 410. It should be noted that if backup bandwidth is exhausted to the point that the routine cannot establish backup pairs for later processed link pairs, it may be necessary to repeat the placement of backup tunnels for earlier processed link pairs to attempt a reduction in the amount of bandwidth consumed.

At a step 410, the backup tunnels placed at step 406 are signaled to adjacent nodes for use upon detection of a failure. The backup tunnels are preferably signaled using, e.g., the RSVP protocol, although it is possible to employ other protocols such as, e.g., label distribution protocol (LDP) as known in the art. According to one embodiment of the present invention, there is no signaling of backup bandwidth reservation for the backup tunnels—that is the backup tunnels are signaled with zero bandwidth. The backup bandwidth used by the backup tunnels for one node may therefore also be used by backup tunnels that protect any other node.

The process followed in FIG. 4 may be repeated for each node in the network. A simpler process may be used to provide protection for each link. A single backup tunnel or combination of backup tunnels is defined to protect each unidirectional link and both directions of each bi-directional link. The backup tunnels should have a total bandwidth greater than or equal to the primary bandwidth of the protected link.

Once backup tunnels are defined for all the nodes and links in the network, Fast Reroute protection is in place. Backup tunnels need not be recomputed when LSPs are established and torn down, greatly saving on signaling and overhead. It may, however, be necessary to redetermine backup tunnels after the failure of a link or node but only the backup tunnels that traverse the failed link or node.

Network Device Details

Figure 1:
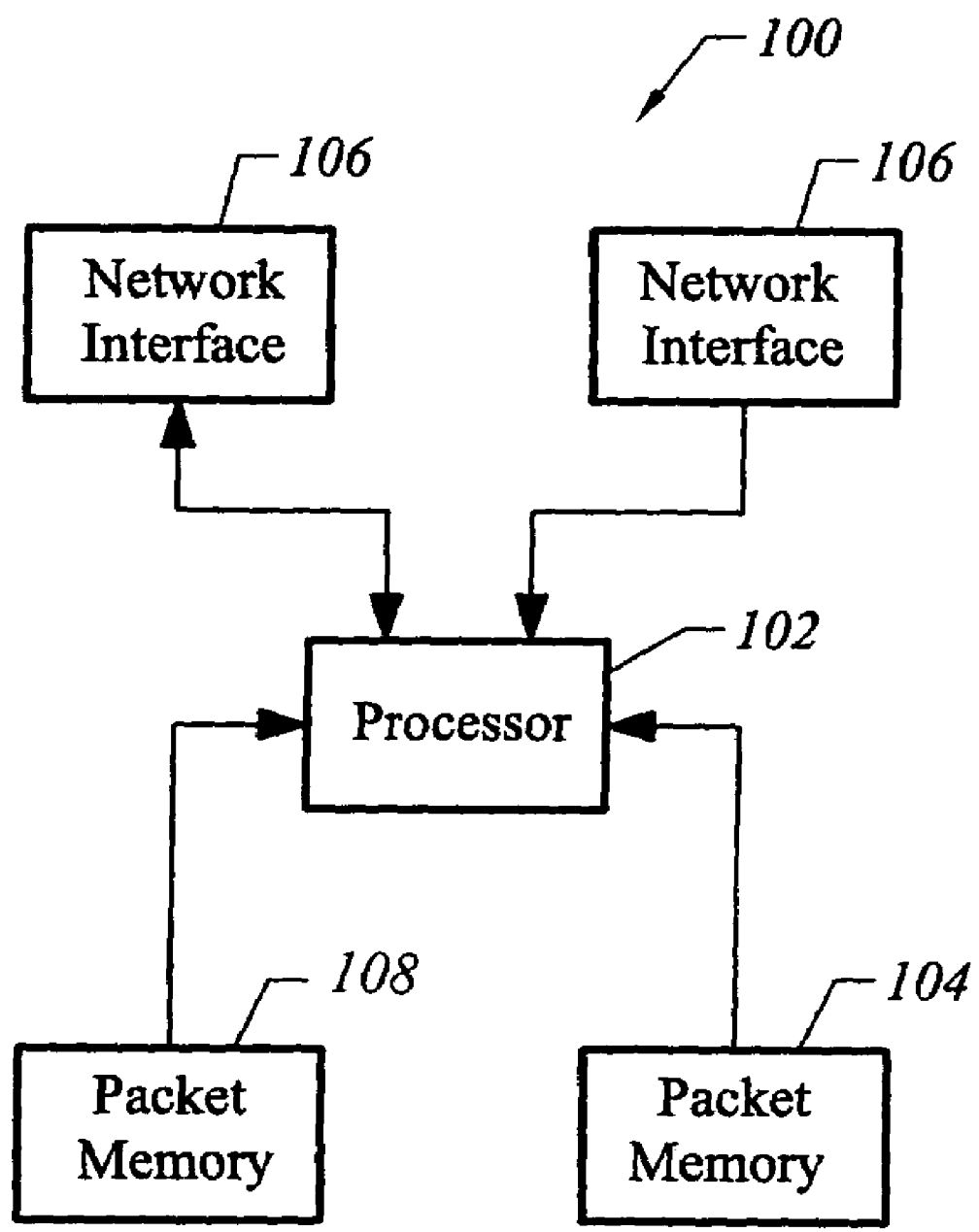
FIG. 1 depicts a network device suitable for implementing one embodiment of the present invention.

FIG. 1 depicts a network device 100 that may be used to implement any of the nodes depicted in FIGS. 2-3 or a network management workstation. In one embodiment, network device 100 is a programmable machine that may be implemented in hardware, software or any combination thereof. A processor 102 executes code stored in a program memory 104. Program memory 104 is one example of a computer-readable storage medium. Program memory 104 can be a volatile memory. Another form of computer-readable storage medium storing the same codes would be some type of non-volatile storage such as floppy disks, CD-ROMs, DVD-ROMs, hard disks, flash memory, etc.

Network device 100 interfaces with physical media via a plurality of network interfaces 106. For example, one of network interfaces 106 may couple to an optical fiber and may incorporate appropriate physical and link layer functionality. Other examples of network interfaces include Ethernet interfaces, DSL interfaces, Gigabit Ethernet interfaces, 10-Gigabit Ethernet interfaces, etc. As packets are received, processed, and forwarded by network device 100, they may be stored in a packet memory 108. Network device 100 implements all of the network protocols and extensions thereof described above as well as the data networking features provided by the present invention.

It will be seen that the present invention provides guaranteed bandwidth in the context of very effective Fast Reroute protection. Protection may be provided sufficiently quickly to continue a high quality Internet experience in the event of a failure. For every protected network element, there is sufficient bandwidth reserved for backup. However, backup bandwidth is also efficiently multiplexed among the various protected elements. There is also a great savings in signaling and overhead because protection is provided for the network elements themselves rather than for numerous LSPs.

It is understood that the examples and embodiments that are described herein are for illustrative purposes only and that various modifications and changes in light thereof will be suggested to persons skilled in the art and are to be included within the spirit and purview of this application and scope of the appended claims and their full scope of equivalents.

The invention claimed is:

1. In a data communication network, a method for protecting a node, said method comprising processes of:
   identifying said node to be protected;
   allocating a primary bandwidth pool on links of said data communication network for use by primary paths;
   allocating a backup bandwidth pool on said links of said data communication network, said backup bandwidth pool on each of said links equal to at least a link speed minus a maximum reservable bandwidth for said primary paths on said link;

identifying a link pair traversing said node to be protected, said link pair having a bandwidth to be protected;

establishing as a backup for said link pair a set of one or more backup paths that do not include said node and wherein said one or more backup paths collectively have backup bandwidth greater than or equal to said bandwidth to be protected;

deducting, for each link included in said set of paths, from backup bandwidth available for protecting said node, while not deducting from backup bandwidth available for protecting other nodes in said data communication network; and repeating said processes of identifying, establishing, and deducting for a plurality of link pairs traversing said node without exceeding available backup bandwidth of links used in establishing said backups;

wherein said bandwidth to be protected of said link pair comprises a lesser of primary bandwidths of links of said link pair traversing said node to be protected.

2. The method of claim 1 wherein said set of one or more paths comprises one or more label switched paths.

3. The method of claim 1 wherein said processes of identifying and establishing occur under control of said node.

4. The method of claim 1 wherein said processes of identifying and establishing occur under control of a computer independent of said node.

5. The method of claim 1 further comprising:
signaling said backups to other nodes adjacent to said node in said data communication network.

6. The method of claim 1 wherein establishing a set of one or more backup paths comprises performing backup path selection computations at said node to be protected.

7. The method of claim 1 further comprising dynamically adjusting said established backup paths in response to a change in one or more of said primary paths.

8. The method of claim 1 wherein said backup paths are established at said node to be protected.

9. The method of claim 1 further comprising signaling said one or more backup paths with zero bandwidth to one or more other nodes.

10. A method for operating a data communication network to provide protection to nodes in said data communication network, said method comprising:

maintaining, for each of a plurality of links in said data communication network, a primary bandwidth pool for use by primary paths and a backup bandwidth pool for use by backup tunnels; and establishing said backup tunnels to protect a plurality of nodes of said network, each of said backup tunnels consuming backup bandwidth from backup bandwidth pools of selected ones of said plurality of links; and wherein all backup tunnels protecting any particular node of said network do not consume more bandwidth on any link than provided by the link's backup bandwidth pool but wherein there is at least one set of backup tunnels that protect disparate nodes and that consume more bandwidth on at least one link than provided by said at least one link's backup bandwidth pool, and wherein establishing backup tunnels comprises signaling said backup tunnels with zero bandwidth to adjacent nodes of each protected node and performing backup tunnel selection computations at each protected node for that protected node.

11. The method of claim 10 wherein at least one of said backup tunnels comprises a label switched path.

12. The method of claim 10 further comprising identifying a failure at said node to be protected and rerouting traffic, wherein said traffic is rerouted in less than 50 milliseconds.

13. The method of claim 10 wherein said primary bandwidth pool comprises a maximum amount of bandwidth that is available for allocation to primary paths.

14. The method of claim 10 wherein said backup bandwidth pool comprises a maximum amount of bandwidth allocated for backup traffic.

15. In a data communication network, a computer-readable storage medium encoded with a computer program for protecting a node, said computer program comprising:

code that identifies said node to be protected;

code that allocates a primary bandwidth pool on links of said data communication network for use by primary paths;

code that allocates a backup bandwidth pool on said links of said data communication network, said backup bandwidth pool on each of said links equal to at least a link speed minus a maximum reservable bandwidth for said primary paths on said link;

code that identifies a link pair traversing said node to be protected, said link pair having a bandwidth to be protected;

code that establishes a backup for said link pair a set of one or more backup paths that do not include said node and wherein one or more backup paths collectively have backup bandwidth greater than or equal to said bandwidth to be protected;

code that deducts, for each link included in said set of paths, from backup bandwidth available for protecting said node, while not deducting from backup bandwidth available for protecting other nodes in said data communication network; and code that repeatedly invokes said code that identifies, establishes, and deducts for a plurality of link pairs connected to said node without exceeding available backup bandwidth of links used in establishing said backups;

wherein said bandwidth to be protected of said link pair comprises a lesser of primary bandwidths of links of said link pair traversing said node to be protected.

16. The computer-readable storage medium of claim 15 wherein said set of one or more paths comprises one or more label switched paths.

17. The computer-readable storage medium of claim 15 further comprising:

code that signals said backups to other nodes adjacent to said node in said data communication network.

18. A computer-readable storage medium encoded with a computer program for operating a data communication network to provide protection to nodes in the data communication network, said computer program comprising:

code that maintains, for each of a plurality of links in said data communication network a primary bandwidth pool for use by primary paths and a backup bandwidth pool for use by backup tunnels; and code that establishes said backup tunnels to protect a plurality of nodes of said network, each of said backup tunnels reserving backup bandwidth from backup bandwidth pools of selected ones of said plurality of links;

wherein all backup tunnels protecting any particular node of said network do not consume more bandwidth on any link than provided by the link's backup bandwidth pool but wherein there is at least one set of backup tunnels that protect disparate nodes and that consume more bandwidth on at least one link than provided by said at least one link's backup bandwidth pool; and wherein code that establishes backup tunnels comprises code that signals said backup tunnels with zero bandwidth to adjacent nodes of each protected node and code that performs backup tunnel selection computations at each protected node for that protected node.

19. The computer-readable storage medium of claim 18 where at least one of said backup tunnels comprises a label switched path.

20. A network device for implementing a node in a data communication network, said network device comprising:
   a processor; and
   a memory storing instruction for said processor, said instructions comprising:
   code that identifies said node to be protected;
   code that allocates a primary bandwidth pool on links of said data communication network for use by primary paths;
   code that allocates a backup bandwidth pool on said links of said data communication network, said backup bandwidth pool on each of said links equal to at least a link speed minus a maximum reservable bandwidth for said primary paths on said link;
   code that identifies a link pair traversing said node to be protected, said link pair having a bandwidth to be protected;
   code that establishes a backup for said link pair a set of one or more backup paths that do not include said node and wherein one or more backup paths collectively have backup bandwidth greater than or equal to said bandwidth to be protected;
   code that deducts, for each link included in said set of paths, from backup bandwidth available for protecting said node, while not deducting from backup bandwidth available for protecting other nodes in said data communication network; and
   code that repeatedly invokes said code that identifies, establishes, and deducts for a plurality of link pairs connected to said node without exceeding available backup bandwidth of links used in establishing said backups;
   wherein said bandwidth to be protected of said link pair comprises a lesser of primary bandwidths of links of said link pair traversing said node to be protected.

21. The network device of claim 20 wherein said set of one or more paths comprises one or more label switched paths.

22. The network device of claim 20 wherein said instructions further comprise:
   code that signals said backups to other nodes adjacent to said node in said data communication network.

23. A network device for implementing a node in a communication network, said network device comprising:
   a processor; and
   a memory storing instruction for said processor, said instructions comprising:
   code that maintains, for each of a plurality of links in said data communication network a primary bandwidth pool for use by primary paths and a backup bandwidth pool for use by backup tunnels; and
   code that establishes said backup tunnels to protect a plurality of nodes of said network, each of said backup tunnels reserving backup bandwidth from backup bandwidth pools of selected ones of said plurality of links;
   wherein all backup tunnels protecting any particular node of said network do not consume more bandwidth on any link than provided by the link's backup bandwidth pool but wherein there is at least one set of backup tunnels that protect disparate nodes and that consume more bandwidth on at least one link than provided by said at least one link's backup bandwidth pool;
   wherein code that establishes backup tunnels comprises code that signals said backup tunnels with zero bandwidth to adjacent nodes of each protected node and code that performs backup tunnel selection computations at each protected node for that protected node.

24. The network device of claim 23 wherein at least one of said backup tunnels comprises a label switched path.

* * * * *